July 27, 1926.
A. NEBERGALL
POULTRY FEEDER
Filed Dec. 1, 1925
1,593,705
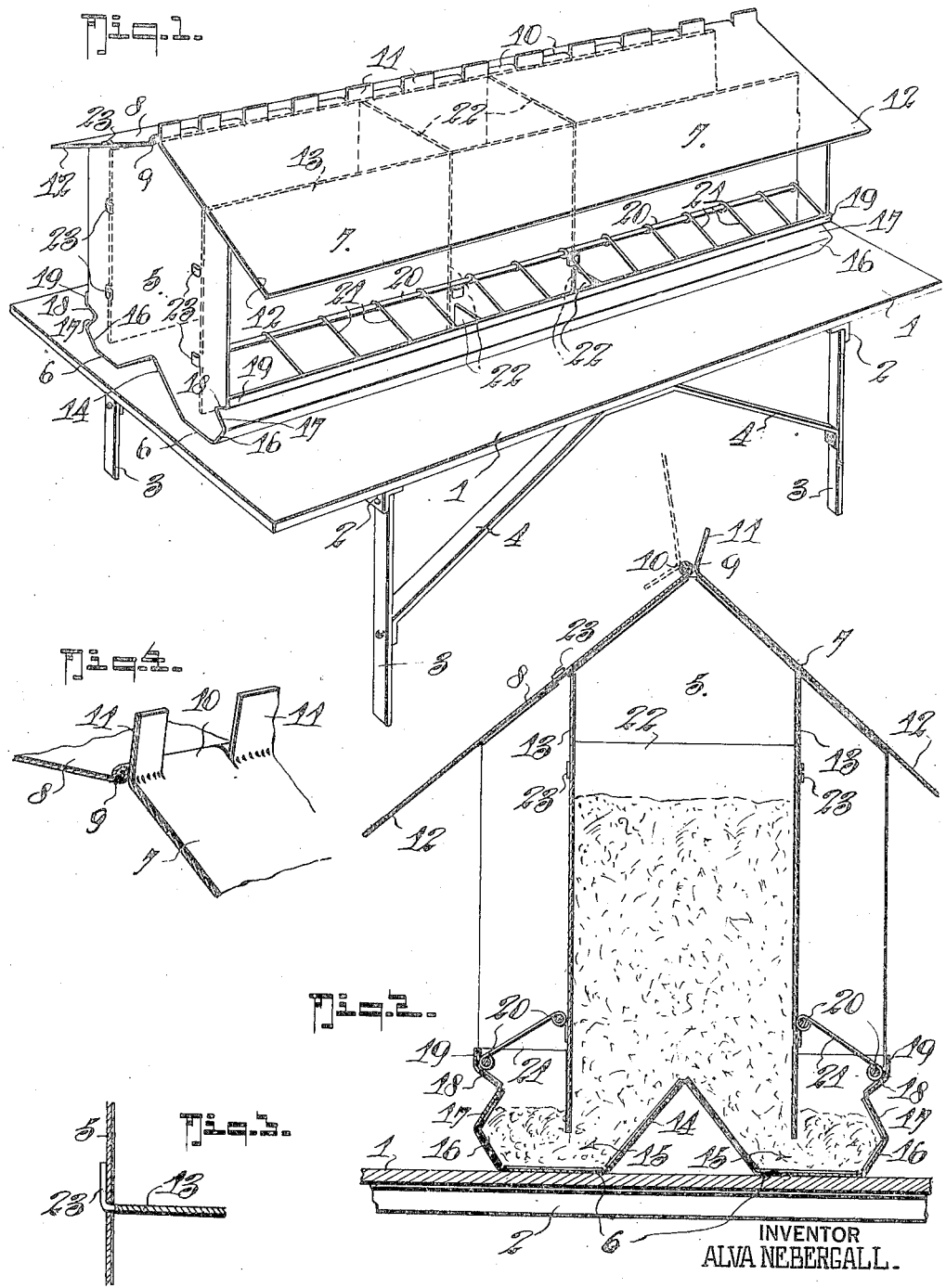
INVENTOR
ALVA NEBERGALL
BY 
ATTORNEY Patented July 27, 1926.

1,593,705

UNITED STATES PATENT OFFICE.

ALVA NEBERGALL, OF WASHINGTON, IOWA.

POULTRY FEEDER.

Application filed December 1, 1925. Serial No. 72,526.

The invention generally relates to that type of feeders adaptable for use in feeding poultry and which include a feed receiving hopper and feed receiving troughs into which the feed is automatically delivered by gravity from the said hopper.

My invention seeks to provide a simple and economically constructed feeder in which means is provided for efficiently feeding the material from a main hopper into lateral feed troughs by gravity action, the said feed troughs being peculiarly constructed for preventing grain loss and contamination of the feed by dirt or other particles scratched up by the poultry, in which means is provided for suitably supporting the feeder above the ground to insure against dampness and contamination as above stated, and in which a roof structure is included which will effectively prevent soaking of the feed by rain and which is also so constructed that poultry may not roost upon the same.

With the above and other objects in view that will hereinafter appear the invention further resides in those novel details of construction, combination and arrangement of parts all of which will be first fully described, then be particularly pointed out in the appended claims, reference being had to the accompanying drawing in which:—

Figure 1 is a perspective view of the invention.

Figure 2 is a vertical cross section thereof.

Figure 3 is an enlarged detail cross section illustrating one of the securing lug connections.

Figure 4 is a detail perspective view showing one roof section hinge edge.

In the drawing in which like numerals of reference indicate like parts in all the figures 1—1 represent perches upon which the poultry may stand when feeding and which are supported above the ground on cross angles 2 and uprights 3 suitably braced as at 4. In this manner the feeder is suitably elevated above the ground to prevent undesired moistening of the feed and to prevent contamination thereof by scratching of the poultry.

The feeder proper includes the end walls 5, the bottom 6 and a roof structure comprising a hinged section 7 and a fixed section 8 which are mounted upon the end walls 5 to incline downwardly from a medial line at which they are hinge connected to the pintle 9 which extends the full length of the feeder and around which are turned the hinge fingers 10. It will be observed that alternate ones 11 of the hinge fingers of one roof section are turned vertically to project above the housing in a manner for frustrating any attempts that may be made by the poultry to roost upon the feeder housing. See Figures 1, 2 and 4.

The lateral edges of the roof sections are extended a considerable distance beyond the edges of the end walls as at 12 to provide overhanging eaves which act as water sheds and prevent wetting of the feed by rain.

Side walls 13 define the lateral limits of the main hopper portion of the housing into which access is had for filling the device with feed through the hinged roof section 7 and the said side walls terminate short of the bottom at their lower ends just to the sides of the inverted central V-shaped portion 14 of the said bottom to provide restricted gravity feed throatways 15 as indicated in Figure 2 of the drawing.

The bottom 6 is extended a distance laterally of the position of the side walls 13 to provide lateral feed troughways and are turned upwardly outwardly as at 16, thence upwardly inwardly as at 17 and again upwardly and outwardly to provide the inwardly inclining ledges 18.

By forming the lateral confining walls of the feed troughways in the manner just described, effective means is provided for preventing loss of grain by reason of the chickens hooking the same out with their beaks or feet and such of the grain that is not actually held in the beak of a fowl will ride back down the inclined ledge 18 into the troughway.

When the feeder is to be used for small baby chicks it may be desirous to provide means for preventing them from scrambling into the troughways and scattering the feed. In this case the ledges 18 may be continued slightly vertical to provide beads 19 for accommodating the positioning of the rectangular wire frames 20 provided with cross wires 21 dividing the same into a plurality of restricted sections too small to permit the passage of a chick but large enough to permit the passage of the heads thereof during normal feeding.

If desired the feeder may be provided with central partition walls 22 by which the same may be divided to provide a central individual compartment for receiving oyster shells or the like.

For the purposes of illustration I have shown the various parts of the housing securely assembled by slots and bent lug connections 23, it being understood of course that other means of assembling the parts may be utilized such as rivets, soldering or the like.

By constructing the feeder such as I have above described means is provided for preventing inadvertent wetting of the feed, for preventing contamination of the feed, and for preventing roosting of the chickens upon the roof of the feeder. Also by providing the central partitions means is not only provided for the reception of oyster shells or the like but the same serve as a strengthening medium for the housing.

The bent fingers 11 not only serve as anti-roost mediums but also as rest lugs when the movable section of the roof is elevated as indicated in dotted lines in Figure 2.

From the foregoing description, taken in connection with the accompanying drawing, it is thought the novel details of construction, the manner of use and the advantages of my invention will be readily apparent to those skilled in the art to which it relates.

What I claim is:—

1. A feeder of the class described comprising a bottom, end walls, and side walls defining a feed receiving hopper, a roof composed of a fixed section and a movable section hinged thereto at a medial line, said sections inclining downwardly from the medial hinge connection to extend beyond the side walls to form water shedding eaves and said hinge connection providing upstanding roost preventing fingers, said bottom being extended beyond the side walls and bent up to provide lateral feed troughways, said side walls terminating short of the bottom to provide restricted passageways from hopper into the troughways.

2. In a feeder of the class described, a roof composed of slanting section hinged at its apex, a pintle for providing the hinge axis, each section having the apex meeting edges thereof provided with fingers rolled around the pintle to form the hinge connection, and at least one of such sections having a plurality of fingers bent upwardly from the hinge edge thereof in a manner for preventing roosting.

3. A feeder of the class described comprising a bottom, end walls, a roof, and side walls defining a feed receiving hopper, said side walls terminating short of the bottom to provide restricted passageways for the feed to pass from the hopper, and said bottom being provided with an inverted V-shaped central ridge for forcing feed toward the passageways and being extended beyond the side walls and bent upwardly to provide feed receiving troughways and upwardly-outwardly to form a waste feed return incline, each said upwardly-outwardly turned edge terminating in a frame supporting edge bead, and frames each having one side supported in a bead and the other side adapted to rest against the respective side wall to position said frame on an incline above the respective troughway, and cross partitions dividing the frame into a plurality of restricted feed compartments.

4. A feeder of the class described comprising a bottom, end walls, a roof, and side walls defining a feed receiving hopper, said side walls terminating short of the bottom to provide restricted passageways for the feed to pass from the hopper, and said bottom being provided with an inverted V-shaped central ridge for forcing feed toward the passageways and being extended beyond the side walls and bent upwardly-outwardly then upwardly-inwardly to provide laterally cupped feed receiving troughways and then bent again upwardly-outwardly to form waste feed return inclines substantially as and for the purposes described.

ALVA NEBERGALL.